United States Patent
Yoo et al.

(10) Patent No.: US 8,952,938 B2
(45) Date of Patent: Feb. 10, 2015

(54) METHOD FOR COMPENSATING POSITION OF POINTING DEVICE AND POINTING DEVICE EMPLOYING THE SAME

(75) Inventors: Ho-june Yoo, Seoul (KR); Byung-seok Soh, Hwaseong-si (KR); Eun-seok Choi, Anyang-si (KR); Sang-on Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 605 days.

(21) Appl. No.: 12/691,071

(22) Filed: Jan. 21, 2010

(65) Prior Publication Data

US 2010/0315386 A1    Dec. 16, 2010

(30) Foreign Application Priority Data

Jun. 13, 2009    (KR) ........................ 10-2009-0052605

(51) Int. Cl.
| | | |
|---|---|---|
| G06F 3/033 | (2013.01) | |
| G06F 3/038 | (2013.01) | |
| G06F 3/0354 | (2013.01) | |
| G06F 3/041 | (2006.01) | |

(52) U.S. Cl.
CPC .......... *G06F 3/0386* (2013.01); *G06F 3/03545* (2013.01); *G06F 3/0416* (2013.01); *G06F 2203/04106* (2013.01)
USPC ....................................... 345/179

(58) Field of Classification Search
USPC ................................ 345/158–183
See application file for complete search history.

(56) References Cited

U.S. PATENT DOCUMENTS

| | | | |
|---|---|---|---|
| 3,512,037 A | 5/1970 | Eckert et al. | |
| 5,661,502 A * | 8/1997 | Cheng ........................... | 345/159 |
| 6,377,250 B1 | 4/2002 | Raviv et al. | |
| 6,509,889 B2 * | 1/2003 | Kamper et al. ............... | 345/157 |
| 8,110,757 B1 * | 2/2012 | Weaver et al. ................ | 345/179 |
| 8,210,434 B2 | 7/2012 | Noguchi et al. | |
| 2004/0201580 A1 * | 10/2004 | Fujiwara et al. .............. | 345/179 |
| 2006/0285727 A1 * | 12/2006 | Landers et al. ............... | 345/179 |
| 2009/0322676 A1 * | 12/2009 | Kerr et al. ..................... | 345/158 |
| 2010/0045636 A1 | 2/2010 | Noguchi et al. | |

FOREIGN PATENT DOCUMENTS

| | | |
|---|---|---|
| JP | 2001-318765 A | 11/2001 |
| JP | 2001318765 A | 11/2001 |
| WO | 2008/090607 A1 | 7/2008 |

OTHER PUBLICATIONS

Communication, dated Apr. 14, 2014, issued by the European Patent Office in counterpart European Application No. 10156765.9.
Communication dated Aug. 11, 2014 issued by European Patent Office in counterpart European application No. 10156765.9.

* cited by examiner

*Primary Examiner* — Ryan A Lubit
(74) *Attorney, Agent, or Firm* — Sughrue Mion, PLLC

(57) ABSTRACT

A pointing device calculates a current position of the pointing device based on a point of time at which an incident signal is sensed, and compensates the current position based on a deviation of position of the pointing device which is calculated using the current position of the pointing device. Accordingly, a problem on the GUI caused by position distortion of the pointing device is minimized.

25 Claims, 9 Drawing Sheets

METHOD FOR COMPENSATING POSITION OF POINTING DEVICE AND POINTING DEVICE EMPLOYING THE SAME

CROSS-REFERENCE TO RELATED APPLICATIONS

This application claims priority from Korean Patent Application No. 10-2009-52605, filed on Jun. 13, 2009, in the Korean Intellectual Property Office, the disclosure of which is incorporated herein by reference in its entirety.

BACKGROUND

1. Field

Methods and apparatuses consistent with the exemplary embodiments relate to a pointing device, and more particularly, to a pointing device which controls a motion of a graphical user interface (GUI) pointer by moving the position of the pointer.

2. Description of the Related Art

FIG. 1A is a view illustrating an electronic board system. As shown in FIG. 1A, the electronic board system includes a display 10 to serve as an electronic board and an electronic pen 20 to serve as a pointing device.

As shown in FIG. 1, it is possible to write on the display 10 with the electronic pen 20. However, unintended writing may appear as shown in the area "A" of FIG. 1B.

The unintended writing appears if distortion occurs due to noise or disturbance when the position of the electronic pen 20 is calculated. Such unintended writing causes inconvenience to a user and negatively affects the expanding use of the electronic board system. Therefore, there is a demand for solving this problem.

SUMMARY

Exemplary embodiments overcome the above disadvantages and other disadvantages not described above. Also, the exemplary embodiments are not required to overcome the disadvantages described above, and an exemplary embodiment of the present invention may not overcome any of the problems described above.

An exemplary embodiment provides a pointing device which compensates a current position based on a deviation of position of the pointing device when calculating the current position of the pointing device based on a point of time at which an incident signal is detected.

According to an aspect, a pointing device includes: a first sensor which senses an incident signal, a first calculator which calculates a current position CP of the pointing device based on a point of time at which the first sensor senses the incident signal, and a compensator which compensates the current position CP based on a deviation of position DP which is calculated using the current position CP of the pointing device calculated by the first calculator.

The first sensor may sense an incident signal which is output from a surface of a display.

The first sensor may sense a first signal which is unintentionally generated and output when the display is driven, and a second signal which is intentionally generated and output when the display is driven.

The first signal may be a signal which is unintentionally output due to electro magnetic interference (EMI) generated in the display, and the second signal may be an infrared (IR) signal which is intentionally generated and output from the display.

The second signal may include a first IR signal and a second IR signal, and, with reference to a point of time at which the first signal is sensed, the first calculator may calculate a current position on a first axis of the pointing device using a point of time at which the first IR signal is sensed, and may calculate a current position on a second axis of the pointing device using a point of time at which the second IR signal is sensed.

The first IR signal may be output from the display in sequence along the first axis, and the second IR signal may be output from the display in sequence along the second axis.

The compensator may calculate a compensated current position CP' by adding a previous position PP of the pointing device and the current position CP according to a first ratio, and the first ratio may be determined based on the deviation of position DP.

If the deviation of position DP is greater than a first threshold deviation of position DP_th1, the compensator may set a weight of the previous position PP to be higher than a weight of the current position CP and calculate the compensated current position CP', and, if the deviation of position DP is less than the first threshold deviation of position DP_th1, the compensator may set the weight of the current position CP to be higher than the weight of the previous position PP and calculate the compensated current position CP'.

The pointing device may further include: a second sensor which senses a motion of the pointing device, and a second calculator which calculates the motion of the pointing device based on a result of sensing by the second sensor, and the compensator may calculate a deviation of motion DM of the pointing device based on the motion of the pointing device calculated by the second calculator, and may calculate a compensated current position CP' by adding a previous position PP of the pointing device compensated by the compensator, the deviation of position DP and the deviation of motion DM according to a second ratio, and the second ratio may be determined based on the deviation of position DP.

If the deviation of motion DM is greater than a second threshold deviation of position DP_th2, the compensator may set a weight of the deviation of motion DM to be higher than a weight of the deviation of position DP, and, if the deviation of motion DM is less than the second threshold deviation of position DP_th2, the compensator may set the weight of the deviation of position DP to be higher than the deviation of motion DM.

The pointing device may further include: a second sensor which senses a motion of the pointing device, and a second calculator which calculates the motion of the pointing device based on a result of sensing by the second sensor, and the compensator calculates a deviation of motion DM of the pointing device based on the motion of the pointing device calculated by the second calculator, selects at least one of a previous position PP of the pointing device which is compensated by the compensator and the deviation of position DP by referring to the deviation of position DP and the deviation of motion DM, and calculates a compensated current position CP' using the selected one.

If the deviation of position DP is greater than a third threshold deviation of position DP_th3 and the deviation of motion DM is less than a threshold deviation of motion DM_th, the compensator may calculate the compensated current position CP' using the previous position PP, and if the deviation of position DP is less than or equal to the third threshold deviation of position DP_th3 and the deviation of motion DM is greater than or equal to the threshold deviation of motion DM_th, the compensator may calculate the compensated current position CP' using the previous position PP and the deviation of position DP.

According to another aspect, a method for compensating a position of a pointing device includes: a first calculating operation of calculating a current position CP of the pointing device based on a point of time at which an incident signal is sensed, and compensating the current position CP based on a deviation of position DP which is calculated using the current position CP of the pointing device calculated in the first calculating operation.

The first calculating operation may sense an incident signal which is output from a surface of a display.

The first calculating operation may sense a first signal which is unintentionally generated and output when the display is driven, and a second signal which is intentionally generated and output when the display is driven.

The first signal may be a signal which is unintentionally output due to EMI generated in the display, and the second signal may be an IR signal which is intentionally generated and output from the display.

The second signal may include a first IR signal and a second IR signal, and, with reference to a point of time at which the first signal is sensed, the first calculating operation may calculate a current position on a first axis of the pointing device using a point of time at which the first IR signal is sensed, and may calculate a current position on a second axis of the pointing device using a point of time at which the second IR signal is sensed.

The compensating operation may calculate a compensated current position CP' by adding a previous position PP of the pointing device and the current position CP according to a first ratio, and the first ratio may be determined based on the deviation of position DP.

The method may further include a second calculating operation of sensing a motion of the pointing device and calculating the motion of the pointing device, and the compensating operation may calculate a deviation of motion DM of the pointing device based on the motion of the pointing device calculated in the second calculating operation, and calculates a compensated current position CP' by adding a compensated previous position PP' of the pointing device, the deviation of position DP and the deviation of motion DM according to a second ratio, and the second ratio may be determined based on the deviation of position DP.

The method may further include a second calculating operation of sensing a motion of the pointing device and calculating the motion of the pointing device, and the compensating operation may calculate a deviation of motion DM of the pointing device based on the motion of the pointing device calculated in the second calculating operation, select at least one of a compensated previous position PP' of the pointing device and the deviation of position DP by referring to the deviation of position DP and the deviation of motion DM, and calculate a compensated current position CP' using the selected one.

Additional aspects and advantages will be set forth in the detailed description, will be obvious from the detailed description, or may be learned by practicing the exemplary embodiments.

BRIEF DESCRIPTION OF THE DRAWING FIGURES

The above and/or other aspects of the present invention will be more apparent by describing in detail exemplary embodiments thereof, with reference to the accompanying drawings in which.

DETAILED DESCRIPTION OF THE EXEMPLARY EMBODIMENTS

Figure 1A:
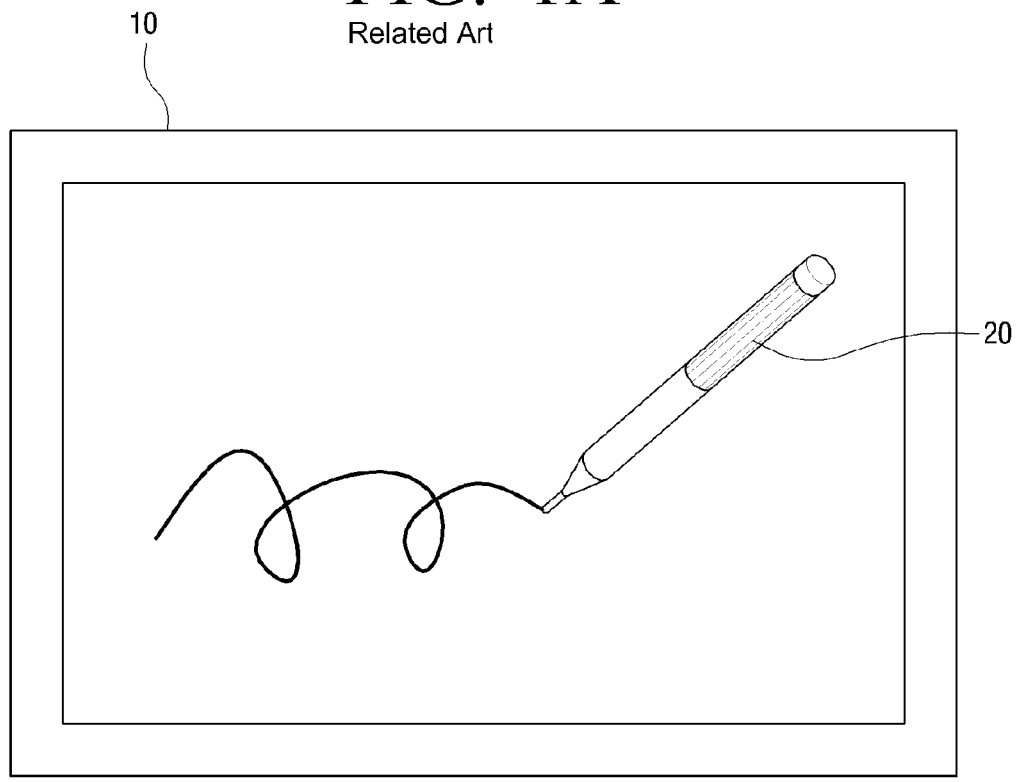
FIGS. 1A and 1B are views provided to explain an electronic board system on which unintended writing appears.
Figure 1B:
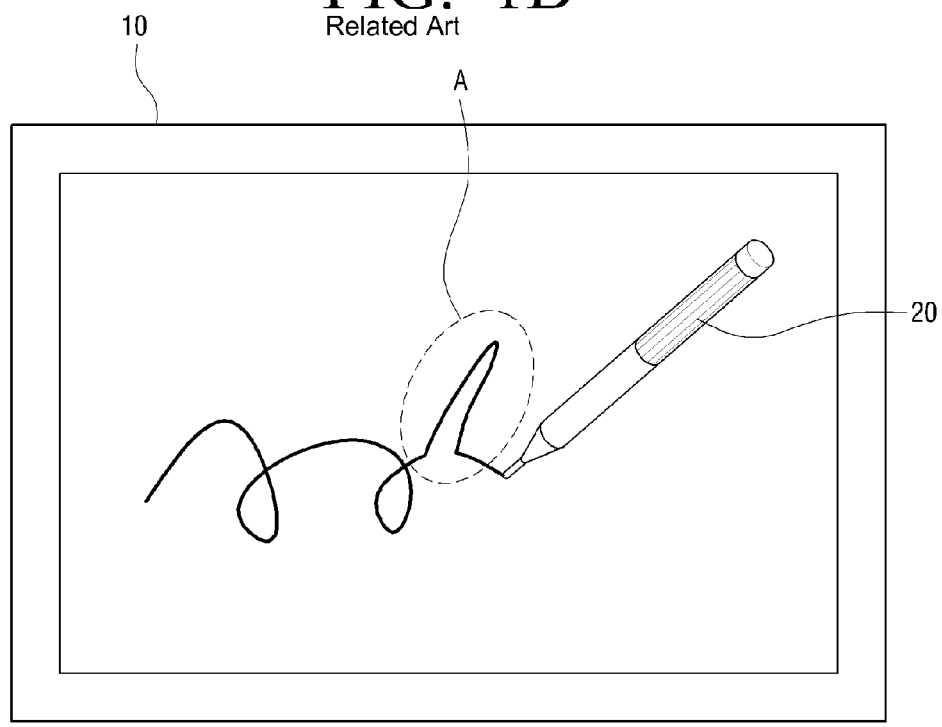

Hereinafter, the exemplary embodiments will be described in greater detail with reference to the accompanying drawings, in which exemplary embodiments are shown.

In the following description, same reference numerals are used for the same elements when they are depicted in different drawings. The matters defined in the description, such as detailed construction and elements, are provided to assist in a comprehensive understanding of the exemplary embodiments. Thus, it is apparent that the exemplary embodiments of the present invention can be carried out without those specifically defined matters. Also, functions or elements known in the related art are not described in detail since they would obscure the invention with unnecessary detail.

Figure 2:
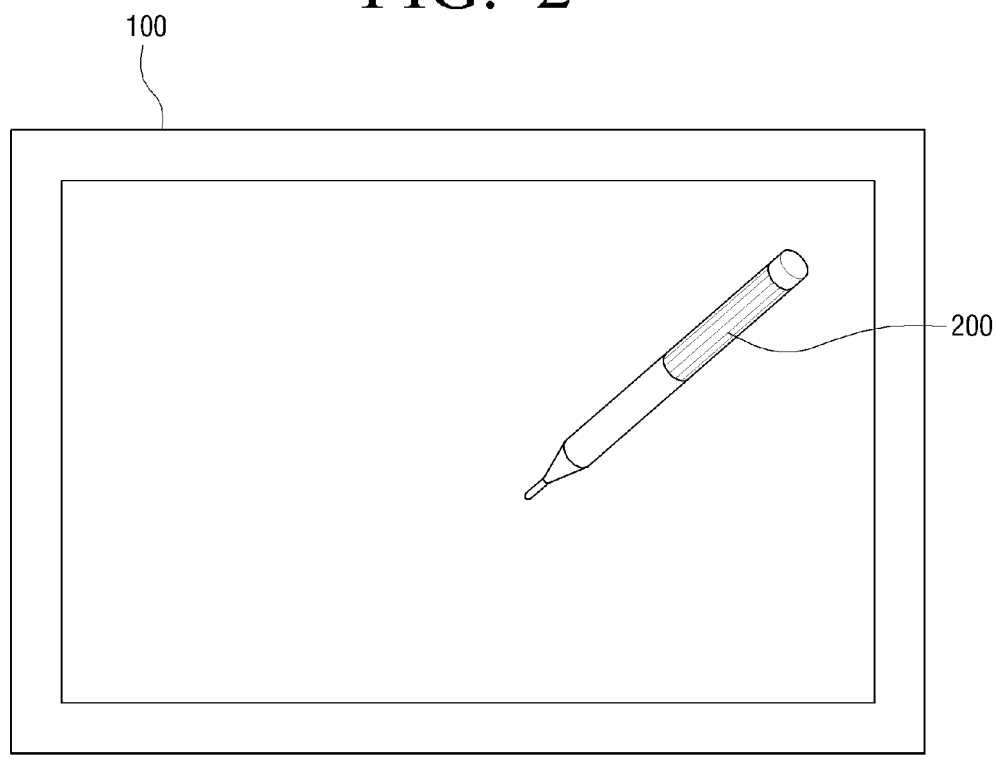
FIG. 2 is a view illustrating an exemplary embodiment of an electronic board system.

FIG. 2 is a view illustrating an electronic board system to which the exemplary embodiment is applicable. As shown in FIG. 2, the electronic board system includes a plasma display panel (PDP) 100 to serve as an electronic board and an electronic pen 200 to serve as a pointing device.

1. Exemplary Embodiment 1

Figure 3:
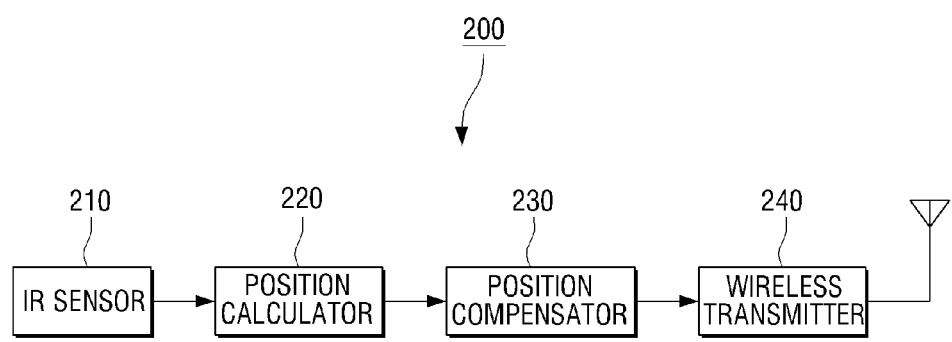
FIG. 3 is a block diagram illustrating an exemplary embodiment of the electronic pen of FIG. 2.

FIG. 3 is a block diagram illustrating an exemplary embodiment of the electronic pen 200 of FIG. 2. As shown in FIG. 3, the electronic pen 200 includes an infrared (IR) sensor 210, a position calculator 220, a position compensator 230, and a wireless transmitter 240.

(1) Calculating a Current Position of the Electronic Pen 200

The IR sensor 210 is located at a pen point of the electronic pen 200 and senses an infrared (IR) signal output from a surface of the PDP 100.

The position calculator 220 calculates a current position CP of the electronic pen 200 based on a result of sensing by the IR sensor 210. Hereinafter, a method for calculating a current position CP of the electronic pen 200 will be explained in detail with reference to FIGS. 4A to 4C.

Figure 4A:
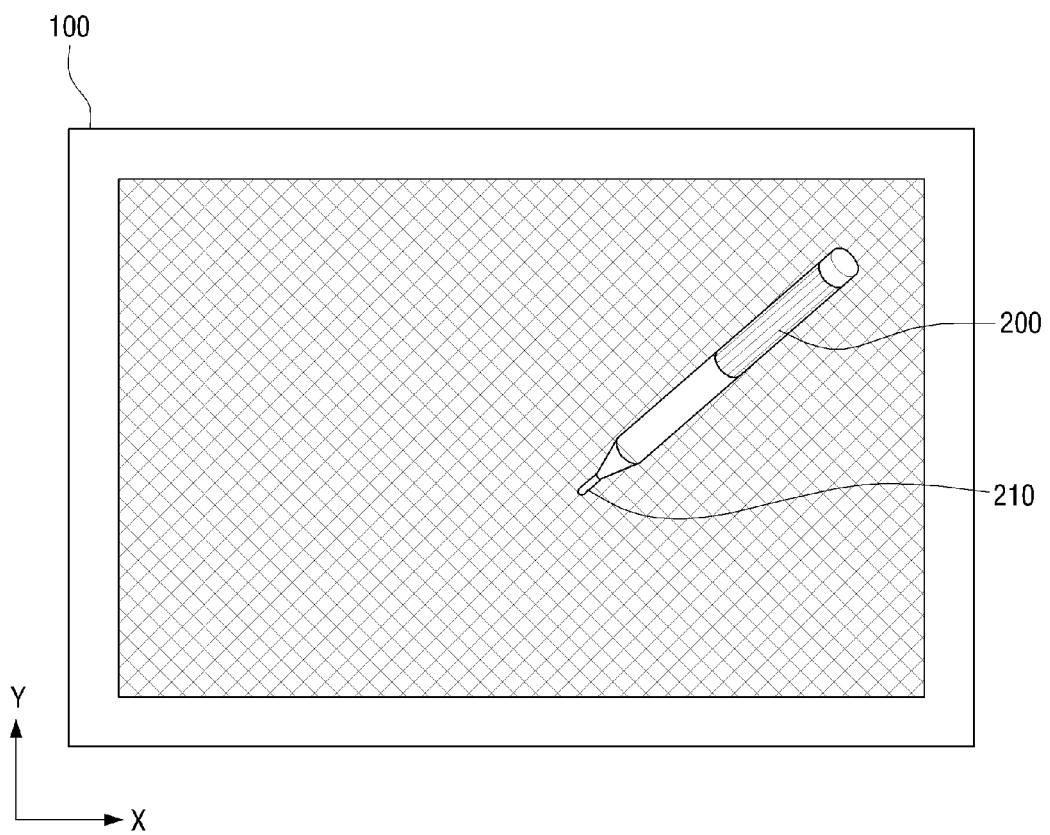
FIGS. 4A to 4C are views provided to explain an exemplary embodiment of a method for calculating a current position of the electronic pen.
Figure 4B:
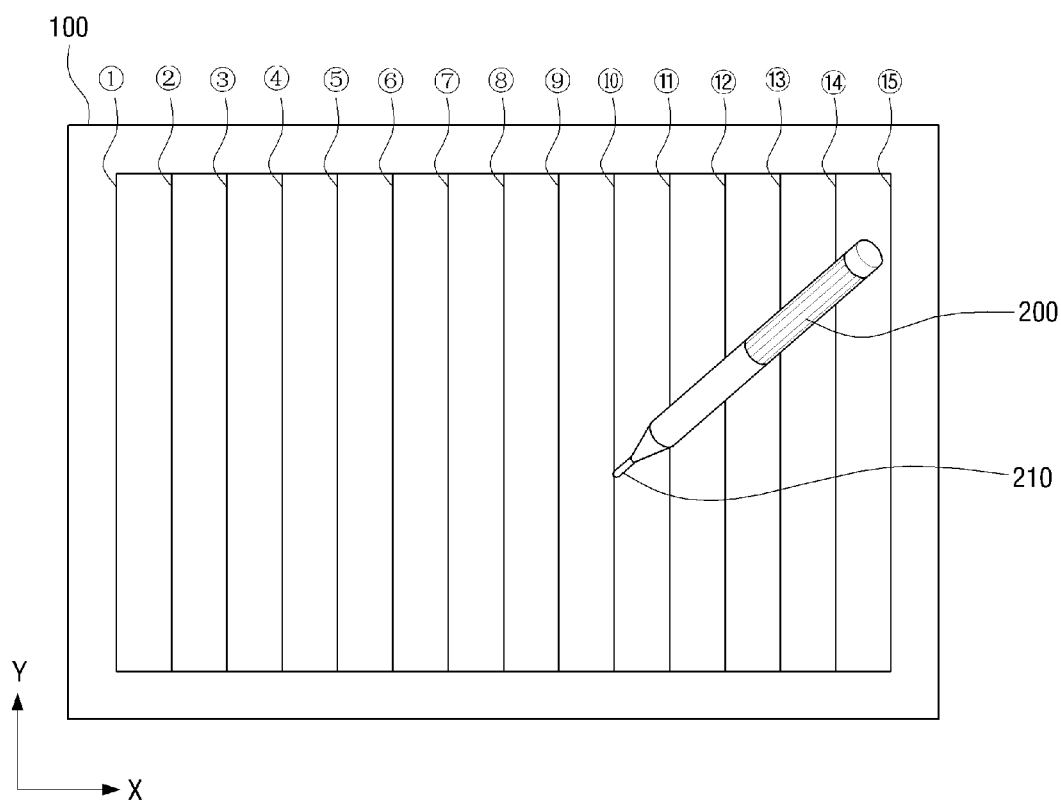
Figure 4C:
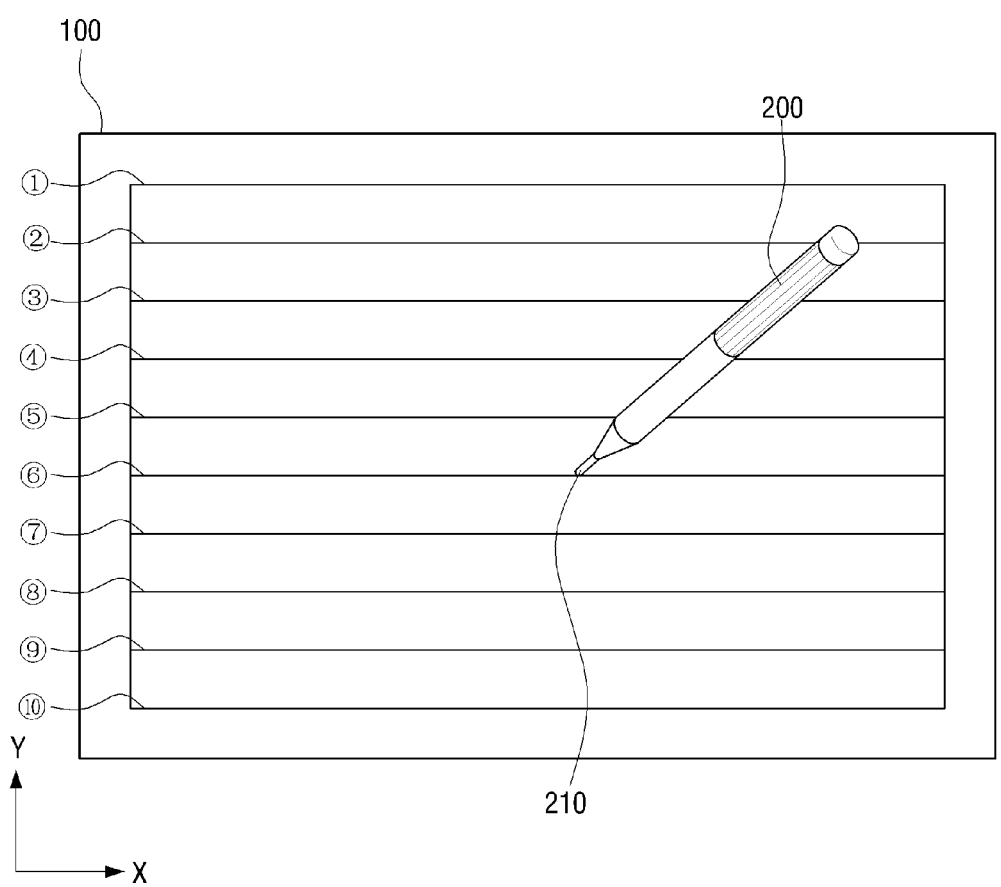

FIGS. 4A to 4C are views provided to explain a method for calculating a current position CP of the electronic pen 200 using the IR sensor 210 and the position calculator 220.

1) Setting a Reference Time

FIG. 4A illustrates a situation in which the IR signal is output from the PDP 100 serving as an electronic board at a frame starting time due to electro magnetic interference (EMI). The EMI is caused by driving signals (discharge signals) which are applied at the frame starting time of the PDP 100.

The IR signal output from the PDP 100 due to the EMI is an unintended signal and is output from the entire surface of the PDP 100. Therefore, the IR sensor 210 always senses the IR signal from the PDP 100 regardless of the current position CP of the electronic pen 200.

The position calculator 220 sets a point of time at which the IR sensor 210 senses the IR signal as a "reference time".

2) Calculating a Current Position CP on an X-Axis of the Electronic Pen 200

FIG. 4B illustrates a situation in which IR signals of a line pattern perpendicular to the x-axis are output from the PDP 100 in sequence while moving along the x-axis, after the IR signal is output due to the EMI as shown in FIG. 4A.

That is, in FIG. 4B, the IR signals are output from the PDP 100 in sequence in a manner that a first IR signal (①), a second IR signal (②), a third IR signal (③), ... and a fifteenth IR signal (⑮) are output.

These IR signals are IR signals which are intentionally generated and output from the PDP 100. That is, the IR signals are generated by controlling the driving signals of the PDP 100.

As shown in FIG. 4B, only the tenth IR signal (⑩) is sensed by the IR sensor 210 among from the IR signals (①-⑮) output in sequence.

The position calculator 220 calculates a current position CP_x of the electronic pen 200 on the x-axis based on a time difference between "a point of time at which the IR signal is sensed by the IR sensor 210" and the "reference time". Herein, the reference time refers to a point of time at which the IR signal output from the PDP 100 due to the EMI is sensed by the IR sensor 210, as described above.

In the case as shown in FIG. 4B, the current position CP_x on the x-axis of the electronic pen 200 is calculated based on the time difference between the "reference time" and the "a point of time at which the tenth IR signal (⑩) is sensed.

As the time difference between the point of time at which the IR signal is sensed by the IR sensor 210 and the reference time is greater, the current position CP_x on the x-axis of the electronic pen 200 is located nearer to the right, and as the time difference is smaller, the current position CP_x on the x-axis of the electronic pen 200 is located nearer to the left.

3) Calculating a Current Position on a Y-Axis of the Electronic Pen 200

FIG. 4C illustrates a situation in which IR signals of a line pattern perpendicular to the y-axis are output from the PDP 100 in sequence while moving along the y-axis, after the IR signals are output while moving along the x-axis as shown in FIG. 4B.

That is, in FIG. 4C, the IR signals are output from the PDP 100 in sequence in a manner that a first IR signal (①), a second IR signal (②), a third IR signal (③), ... and a tenth IR signal (⑩) are output.

These IR signals are IR signals which are intentionally generated and output from the PDP 100. That is, the IR signals are generated by controlling the driving signals of the PDP 100.

As shown in FIG. 4C, only the sixth IR signal (⑥) is sensed by the IR sensor 210 among from the IR signals (①-⑩) output in sequence.

The position calculator 220 calculates a current position CP_y on the y-axis of the electronic pen 200 based on a time difference between a "point of time at which the IR signal is sensed by the IR sensor 210" and the "reference time". Herein, the reference time refers to a point of time at which the IR signal output from the PDP 100 due to the EMI is sensed by the IR sensor 210.

In the case shown in FIG. 4C, the current position CP_y on the y-axis of the electronic pen 200 is calculated based on the time difference between the reference time and the point of time at which the sixth IR signal (⑥) is sensed.

As the time difference between the point of time at which the IR signal is sensed by the IR sensor 210 and the reference time is greater, the current position CP_y on the y-axis of the electronic pen 200 is located nearer to the downside of FIG. 4C, and as the time difference is smaller, the current position CP_y on the y-axis of the electronic pen 200 is located nearer to the upside.

4) Calculating a Current Position CP of the Electronic Pen 200 on a Real Time Basis 1) Setting the reference time, 2) calculating the current position on the x-axis of the electronic pen 200 and 3) calculating the current position on the y-axis of the electronic pen 200 are performed in sequence from the starting part of one frame section.

Also, the operations 1), 2) and 3) are repeated with a frame period. Accordingly, the current position CP of the electronic pen 200 is calculated 60 times per second, that is, is almost calculated on a real time basis.

(2) Compensating the Current Position CP of the Electronic Pen 200

The position compensator 230 of FIG. 2 compensates the current position CP of the electronic pen 200 calculated by the position calculator 220. More specifically, if the current position CP of the electronic pen 200 is determined to be seriously distorted (to have a fault), the position compensator 230 determines that the variation in the position of the electronic pen 200 is caused by noise or disturbance rather than a user's manipulation, compensates the position, and outputs a compensated current position CP'.

It is determined that the current position CP of the electronic pen 200 is seriously distorted (has a fault) if the current position CP of the electronic pen 200 is changed from a previous position PP abruptly and abnormally.

Compensating the current position CP of the electronic pen 200 by the position compensator 230 is expressed by the following equation 1:

$$X(k)=W(k)x(k-1)+(1-W(k))x(k)$$

$$Y(k)=W(k)y(k-1)+(1-W(k))y(k) \qquad \text{[Equation 1]}$$

wherein $X(k)$ is a compensated current position on the x-axis (CP'_x), $x(k)$ is a current position on the x-axis (CP_x), $x(k-1)$ is a previous position on the x-axis (PP_x), $Y(k)$ is a compensated current position on the y-axis (CP'_y), $y(k)$ is a current position on the y-axis (CP_y), $y(k-1)$ is a previous position on the y-axis (PP_y), and $W(k)$ is a weight function, satisfying $0 \le W(k) < 1$.

$W(k)$ is a function which changes according to a deviation of position [DP(k)] (that is, a function depending on the deviation of position [DP(k)]), and the deviation of position [DP(k)] is expressed by the following equation 2:

$$DP(k)=\sqrt{(x(k)-x(k-1))^2+(y(k)-y(k-1))^2} \qquad \text{[Equation 2]}$$

According to equation 2, the deviation of position [DP(k)] corresponds to a distance between the "current position [x(k), y(k)] of the electronic pen 200" and the "previous position [x(k-1), y(k-1)] of the electronic pen 200" (hereinafter, referred to as a "moving distance of the electronic pen 200").

Figure 5:
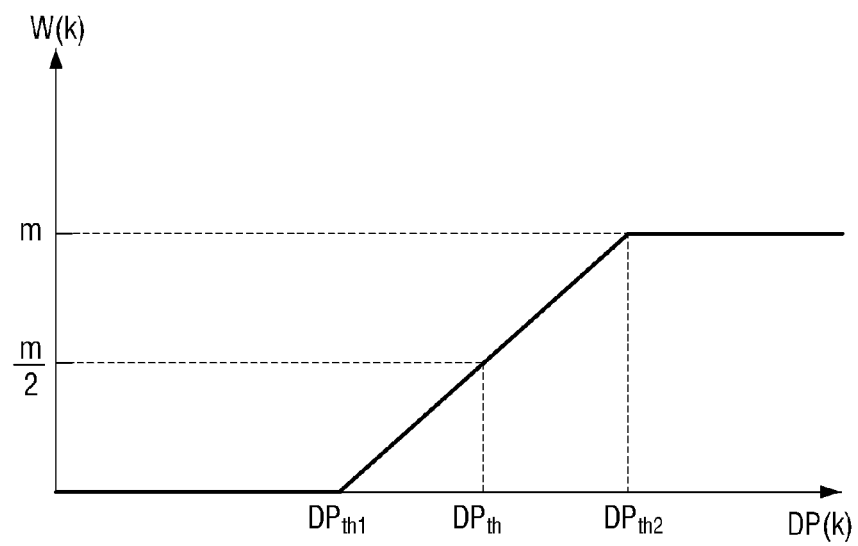
FIG. 5 is a graph illustrating an exemplary embodiment of a weight function W(k)

$W(k)$ is expressed by a non-linear function shown in FIG. 5. Considering $W(k)$ of FIG. 5 and equation 1, the following relations are derived:

1) If the deviation of position [DP(k)] is less than a first threshold deviation of position $DP_{th1}$, (that is, if the moving distance of the electronic pen 200 is very short, $W(k)=0$ and equation 1 is simplified to the following equation 3:

$$X(k)=W(k)x(k-1)+(1-W(k))x(k)=x(k)$$

$$Y(k)=W(k)y(k-1)+(1-W(k))y(k)=y(k) \quad \text{[Equation 3]}$$

According to equation 3, if the deviation of position [DP(k)] is very small, the compensated current position [X(k), Y(k)] is equal to the current position [x(k), y(k)]

The deviation of position [DP(k)] is determined to be very small if position distortion is not caused by noise or disturbance. In this case, since no compensating process is required, the above process is applied.

2) If the deviation of position [DP(k)] is greater than or equal to a second threshold deviation of position $DP_{th2}$, (that is, if the moving distance of the electronic pen 200 is very long, W(k)=m (m is close to 1 but smaller than 1).

If m=0.99, equation 1 is expressed by the following equation 4:

$$X(k)=W(k)x(k-1)+(1-W(k))x(k)=0.99x(k-1)+0.01x(k)$$

$$Y(k)=W(k)x(k-1)+(1-W(k))x(k)=0.99x(k-1)+0.01x(k) \quad \text{[Equation 4]}$$

According to equation 4, if the deviation of position [DP(k)] is very great, the previous position [x(k−1), y(k−1)] is considered more significantly than the current position [x(k), y(k)] in calculating a compensated current position [X(k), Y(k)], That is, in calculating a compensated current position [X(k), Y(k)] by adding the current position [(x(k), y(k)] and the previous position [x(k−1), y(k−1)] according to a certain ratio, a weight of the previous position [x(k−1), y(k−1)] is set to be higher than a weight of the current position [x(k), Y(k)].

The deviation of position [DP(k)] is determined to be very great if the degree of position distortion caused by noise or disturbance is great. In this case, since a great number of compensations are required, the above process is applied.

3) If the deviation of position [DP(k)] is greater than or equal to the first threshold deviation of position $DP_{th1}$ and is less than the second threshold deviation of position $DP_{th2}$, (that is, if the moving distance of the electronic pen 200 is neither very short nor long, W(k)=aDP(k) is established and W(k) is proportional to DP(k). Herein, "a" is a proportional constant [=m/($DP_{th2}$−$DP_{th1}$)].

According to equation 1, if the deviation of position [DP(k)] is between the threshold deviations of the position ($DP_{th1}$, $DP_{th2}$), a compensated current position [X(k),Y(k)] is calculated by adding the current position [x(k), y(k)] and the previous position [x(k−1), y(k−1)] according to a certain ratio.

The certain ratio is determined according to the deviation of position [DP(k)]. In the case of m=1, i) if the deviation of position [DP(k)] is less than a threshold deviation of position $DP_{th}$, "W(k)<½" is established and the weight of the current position [x(k), y(k)] is set to be higher than the weight of the previous position [x(k−1), y(k−1)], ii) if the deviation of position [DP(k)] is greater than the threshold deviation of position $DP_{th}$, "W(k)>½" is established and the weight of the previous position [x(k−1), y(k−1)] is set to be higher than the weight of the current position [x(k), y(k)], and iii) if the deviation of position [DP(k)] is equal to the threshold deviation of position $DP_{th}$, "W(k)=½" is established and the weight of the previous position [x(k−1), y(k−1)] is equal to the weight of the current position [x(k), y(k)].

Accordingly, if the deviation of position [DP(k)] is between the threshold deviations of position ($DP_{th1}$, $DP_{th2}$), (that is, if the deviation of position [DP(k)] is in a middle level), the position compensation is achieved in proportion to the deviation of position [DP(k)].

Although the weight function [W(k)] is commonly defined for both the x-axis and the y-axis, this is merely an example. Therefore, the weight function for the x-axis [Wx(k)] and the weight function for the y-axis [Wy(k)] may be separately defined. In this case, the weight function for the x-axis [Wx(k)] is defined based on the deviation of position for the x-axis [DPx(k)], and the weight function for the y-axis [Wy(k)] is defined based on the deviation of position for the y-axis [DPy(k)].

(3) Transmitting/Processing the Compensated Current Position of the Electronic Pen 200

The wireless transmitter 240 of FIG. 3 wirelessly transmits the compensated current position CP' of the electronic pen 200 which has been compensated by the position compensator 230 to the PDP 100 on a real time basis.

Then, the PDP 100 uses the current position of the electronic pen 200 in GUI processing. The GUI processing includes moving the pointer by moving the position of the electronic-pen 200 and drawing by moving the position of the electronic pen 200.

2. Exemplary Embodiment 2

Figure 6:
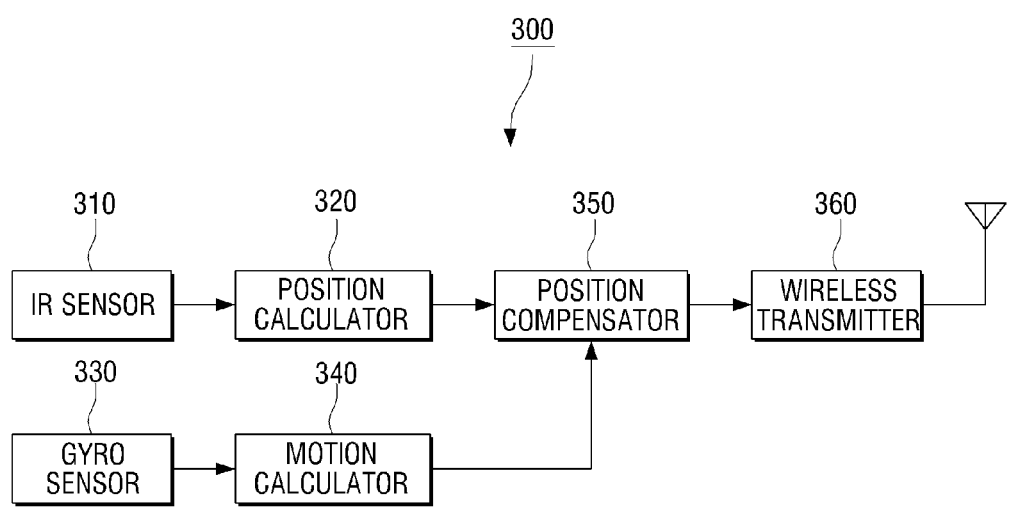
FIG. 6 is a block diagram illustrating an alternative exemplary embodiment of the electronic pen of FIG. 3.

FIG. 6 is a block diagram illustrating a different example of the electronic pen from that of FIG. 3.

As shown in FIG. 6, an electronic pen 300 includes an IR sensor 310, a position calculator 320, a gyro sensor 330, a motion calculator 340, a position compensator 350, and a wireless transmitter 360.

(1) Calculating a Current Position of the Electronic Pen 300

Since a method for calculating a current position CP of the electronic pen 300 using the IR sensor 310 and the position calculator 320 is the same as the method for calculating the current position CP of the electronic pen 200 using the IR sensor 210 and the position calculator 220 of FIG. 3, the detailed description thereof is omitted.

The electronic pen 300 of FIG. 6 can calculate the current position of the electronic pen 300 using the gyro sensor 330 and the motion calculator 340. This calculating method can be used if the electronic pen 300 is far away from the PDP 100 and thus the IR sensor 310 cannot sense an IR signal from the PDP 100.

In this case, the gyro sensor 330 senses a motion of the electronic pen 300. The motion calculator 340 calculates the motion of the electronic pen 300 based on a result of sensing by the gyro sensor 330, and calculates the current position of the electronic pen 300 based on the calculated motion.

(2) Compensating the Current Position CP of the Electronic Pen 300

If noise or disturbance occurs when the IR sensor 310 senses an IR signal, the same noise or disturbance does not occur in the gyro sensor 330. This is because the target to be sensed by the gyro sensor 330 has nothing to do with the target to be sensed by the IR sensor 310.

The motion of the electronic pen 300 calculated by the motion calculator 340 based on the result of sensing by the gyro sensor 330 may be used to compensate the current position CP of the electronic pen 300 which is calculated by the position calculator 320 based on the result of sensing by the IR sensor 310. This will be described in detail hereinbelow.

The position compensator 350 of FIG. 6 compensates the current position CP of the electronic pen 300 calculated by the position calculator 320. More specifically, if the current position CP of the electronic pen 300 is determined to be seriously distorted (to have a fault), the position compensator 350 determines that the variation in the position of the electronic pen 300 is caused by noise or disturbance rather than by a user's manipulation, and compensates the current position and outputs a compensated current position CP'.

It is determined that the current position CP of the electronic pen 300 is seriously distorted (has a fault) if the current position CP of the electronic pen 300 is changed from a previous position PP abruptly and abnormally.

1) Method 1 for Compensating a Position

Compensating the current position CP of the electronic pen 300 by the position compensator 350 is expressed by the following equation 5:

$$X(k)=X(k-1)+V(k)DPx(k)+(1-V(k))DMx(k)$$

$$Y(k)=Y(k-1)+V(k)DPy(k)+(1-V(k))DMy(k) \quad \text{[Equation 5]}$$

wherein $X(k)$ is a compensated current position on an x-axis (CP'_x), $X(k-1)$ is a compensated previous position on the x-axis (PP'_x), $DPx(k)$ is a deviation of position on the x-axis (DP_x), $DMx(k)$ is a deviation of motion on the x-axis (DM_x), $Y(k)$ is a compensated current position on the y-axis (CP'_y), $Y(k-1)$ is a compensated previous position on the y-axis (PP'_y), $DPy(k)$ is a deviation of position on the y-axis (DP_y), $DMy(k)$ is a deviation of motion on the y-axis (DM_y), and $V(k)$ is a weight function, satisfying $0 \leq V(k) < 1$.

Meanwhile, $DPx(k)$ and $DPy(k)$ may be calculated by the following equation 6:

$$DPx(k)=x(k)-x(k-1)$$

$$DPy(k)=y(k)-y(k-1) \quad \text{[Equation 6]}$$

wherein $x(k)$ is a current position on the x-axis (CP_x), $x(k-1)$ is a previous position on the x-axis (PP_x), $y(k)$ is a current position on the y-axis (CP_y), and $y(k-1)$ is a previous position on the y-axis (PP_y).

Also, $DMx(k)$ and $DMy(k)$ can be calculated based on the previous motion (PM_x, PM_y) calculated by the motion calculator 340 and the current motion (CM_x, CM_y) calculated by the motion calculator 340.

Also, $V(k)$ is a function which changes according to the deviation of position [$DPx(k)$, $DPy(k)$], that is, depends on the deviation of position [$DPx(k)$, $DPy(k)$]. As the deviation of position [$DPx(k)$, $DPy(k)$] is greater, $V(k)$ is closer to "0", and as the deviation of position [$DPx(k)$, $DPy(k)$] is smaller, $V(k)$ is closer to "1".

Considering $V(k)$ and equation 5, the following relations are derived:

a) If the deviation of position [DP(k)] is small (that is, if the moving distance of the electronic pen 300 is short), $V(k)$ is closer to "1".

In calculating a compensated current position [$X(k)$, $Y(k)$] by adding the compensated previous position [$X(k-1)$, $Y(k-1)$], the deviation of position [$DPx(k)$, $DPy(k)$] and the deviation of motion [$DMx(k)$, $DMy(k)$] according to a certain ratio, a weight of the deviation of position [$DPx(k)$, $DPy(k)$] is set to be higher than a weight of the deviation of motion [$DMx(k)$, $DMy(k)$].

The deviation of position [DP(k)] is determined to be small if the degree of position distortion caused by noise or disturbance is low. In this case, since a great number of position compensations are not required, the above process is applied.

b) If the deviation of position [DP(k)] is great (that is, if the moving distance of the electronic pen 300 is great), $V(k)$ is closer to "0".

In calculating a compensated current position [$X(k)$, $Y(k)$] by adding the compensated previous position [$X(k-1)$, $Y(k-1)$], the deviation of position [$DPx(k)$, $DPy(k)$], and the deviation of motion [$DMx(k)$, $DMy(k)$] according to a certain ratio, the weight of the deviation of motion ($DMx(k)$, $DMy(k)$) is set to be higher than the weight of the deviation of position [$DPx(k)$, $DPy(k)$].

The deviation of position [DP(k)] is determined to be great if the degree of position distortions caused by noise or disturbance is high. In this case, since a great number of position compensations are required, the above process is applied.

Although the weight function [$V(k)$] is commonly defined for both the x-axis and the y-axis, this is merely an example. Therefore, the weight function [$Vx(k)$] for the x-axis and the weight function [$Vy(k)$] for the y-axis may be separately defined. In this case, the weight function [$Vx(k)$] for the x-axis is defined based on the deviation of position [$DPx(k)$] for the x-axis, and the weight function [$Vy(k)$] for the y-axis is defined based on the deviation of position [$DPy(k)$] for the y-axis.

2) Method 2 for Compensating a Position

Compensating the current position CP of the electronic pen 300 by the position compensator 350 is expressed by the following equation 7:

$$X(k)=X(k-1)+Vx(k)DPx(k)$$

$$Y(k)=Y(k-1)+Vy(k)DPy(k) \quad \text{[Equation 7]}$$

wherein $X(k)$ is a compensated current position on the x-axis (CP'_x), $X(k-1)$ is a compensated previous position on the x-axis (PP'_x), $DPx(k)$ is a deviation of position on the x-axis (DP_x), $Y(k)$ is a compensated current position on the y-axis (CP'_y), $Y(k-1)$ is a compensated previous position on the y-axis (PP'_y), $DPy(k)$ is a deviation of position on the y-axis (DP_y), and $Vx(k)$ and $Vy(k)$ are a weight function and are equal to 0 or 1.

Meanwhile, $DPx(k)$ and $DPy(k)$ can be calculated by the aforementioned equation 6. Also, $Vx(k)$ and $Vy(k)$ are expressed by the following equation 8:

$$Vx(k)=0 \text{ (if } DMx(k)<DMx\_th \text{ \& } |DPx(k)|>DPx\_th)$$

$$Vx(k)=1 \text{ (otherwise)}$$

$$Vy(k)=0 \text{ (if } DMy(k)<DMy\_th \text{ \& } |DPy(k)|>DPy\_th)$$

$$Vy(k)=1 \text{ (otherwise)} \quad \text{[Equation 8]}$$

wherein $DMx(k)$ is a deviation of motion on the x-axis (DM_x), and $DMy(k)$ is a deviation of motion on the y-axis (DM_y).

$DMx(k)$ and $DMy(k)$ can be calculated based on the previous motion (PM_x, PM_y) calculated by the motion calculator 340 and the current motion (CM_x, CM_y) calculated by the motion calculator 340.

Considering equation 7 and equation 8, the following relations are derived:

a) With respect to both the x-axis and the y-axis, if the deviation of position [DP(k)] is greater than a threshold deviation of position [DP_th] and the deviation of motion [DM(k)] is less than a threshold deviation of motion [DM_th], the current position CP of the electronic pen 300 calculated by the position calculator 320 is treated as being distorted and thus "$Vx(k)=0$" and "$Vy(k)=0$". Accordingly, the compensated previous position [$X(k-1)$, $Y(k-1)$] is calculated as a compensated current position [$X(k)$, $Y(k)$].

This is the case in which the degree of position distortion caused by noise or disturbance is high, and since a great number of position compensations would be required, the above process is applied.

b) With respect to both the x-axis and the y-axis, if the deviation of position [DP(k)] is less than or equal to a threshold deviation of position [DP_th] and the deviation of motion [DM(k)] is greater than or equal to a threshold deviation of motion [DM_th], the current position CP of the electronic pen 300 calculated by the position calculator 320 is treated as not being distorted and thus "Vx(k)=1" and "Vy(k)=1". Accordingly, the compensated current position [X(k), Y(k)] is calculated by adding the compensated previous position [X(k−1), Y(k−1)] and the deviation of position [DPx(k), DPy(k)]. In this case, there is no or negligible position distortion caused by noise or disturbance. Therefore, since no compensation is required, the above process is applied.

c) With respect to one of the x-axis and the y-axis, if the deviation of position [DP(k)] is greater than a threshold deviation of position [DP_th] and the deviation of motion [DM(k)] is less than a threshold deviation of motion [DM_th], the position for one axis is compensated according to the method "a)" and the position for the other axis is compensated according to the method "b)".

Although the weight function [Vx(k), Vy(k)] is separately defined for each of the x-axis and the y-axis, this is merely an example. Therefore, a weight function [W(k)] may be defined commonly to the x-axis and the y-axis. In this case, the weight function [W(k)] is defined based on the deviation of position for the x-axis [DPx(k)] and the deviation of position for the y-axis [DPy(k)].

(3) Transmitting/Processing the Compensated Current Position of the Electronic Pen 300

The wireless transmitter 360 of FIG. 6 wirelessly transmits the current position CP' of the electronic pen 300 compensated by the position-compensator 350 to the PDP 100 on a real time basis. Then, the PDP 100 uses the current position of the electronic pen 300 in GUI processing.

3. Exemplary Embodiment 3

Figure 7:
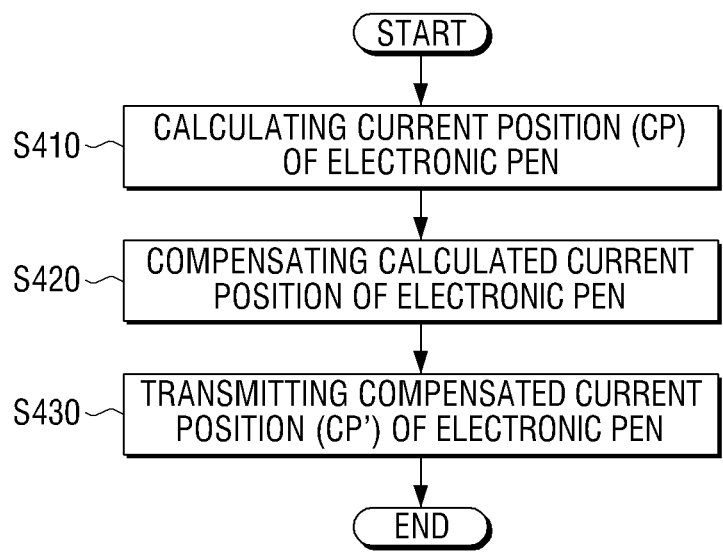
FIG. 7 is a flowchart illustrating a method for compensating a position of an electronic pen according to another exemplary embodiment.

FIG. 7 is a flowchart provided to explain a method for compensating a position of an electronic pen according to another exemplary embodiment.

As shown in FIG. 7, the position-calculator 220, 320 calculates a current position CP of the electronic pen 200, 300 using the result of sensing by the IR sensor 210, 310 (S410).

Then, the position compensator 230, 350 compensates the current position CP of the electronic pen 200, 300 calculated in operation S410 (S420). Compensating in operation S420 is performed according to one of the three methods described above.

After that, the wireless transmitter 240, 360 wirelessly transmits the current position CP' of the electronic pen 200, 300 compensated in operation S420 to the PDP 100 on a real time basis (S430). Then, the PDP 100 uses the current position of the electronic pen 200, 300 in GUI processing.

4. Variant

The electronic pen 200, 300 and the PDP 100 are merely examples for the convenience of explanation. They may be substituted by various types of pointing devices and displays, respectively.

Any other signal can be applied to the exemplary embodiment instead of the IR signal. In this case, the IR sensor 210, 310 may be substituted by a photoelectric sensor. The gyro sensor can be substituted with a different type of a motion sensor.

Also, the aforementioned equations are merely examples and can be changed within the common knowledge of those skilled person in the related art.

Also, although two-dimensional pointing is explained in the above embodiment, three-dimensional pointing can be applied.

As described above, when calculating a current position of a pointing device based on a point of time at which an incident signal is sensed, the current position can be compensated based on a deviation of position of the pointing device so that a problem on the GUI caused by position distortion of the pointing device can be minimized.

Particularly, an error in the IR sensing caused by noise or disturbance in an electronic board system using a PDP is detected and the position of the electronic pen wrongly detected due to the error can be compensated. Accordingly, the user can always use the electronic board system with stable performance without recognizing the error in the IR sensing.

The foregoing exemplary embodiments and advantages are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A pointing device, comprising:
 a first sensor configured to sense an incident signal;
 a first calculator configured to calculate a current position of the pointing device based on a point of time at which the first sensor senses the incident signal; and
 a compensator configured to compensate the current position of the pointing device based on a deviation of position corresponding to a distance between the current position and a previous position and calculated using the current position and the previous position of the pointing device calculated by the first calculator,
 wherein the compensator is configured to calculate the compensated current position by differently applying a weight of the current position to the current position and a weight of the previous position to the previous position according to the deviation of position, and
 wherein the compensator is configured to set the weight of the previous position to be higher than the weight of the current position regardless of the direction of the deviation and configured to calculate the compensated current position when the deviation of position is greater than or equal to a threshold deviation of position according to a ratio that corresponds to respective weights.

2. The pointing device as claimed in claim 1, wherein the incident signal is output from a surface of a display.

3. The pointing device as claimed in claim 2, wherein the first sensor is configured to sense a first signal which is generated and output when the display is driven, and is configured to sense a second signal which is generated and output when the display is driven.

4. The pointing device as claimed in claim 3, wherein the first signal comprises a signal which is output due to electro magnetic interference generated in the display, and the second signal comprises an infrared (IR) signal which is generated and output from the display.

5. The pointing device as claimed in claim 3, wherein the second signal comprises a first IR signal and a second IR signal,
 wherein the first calculator is configured to calculate the current position on a first axis of the pointing device using a point of time at which the first IR signal is sensed, and is configured to calculate the current position on a second axis of the pointing device using a point of time at which the second IR signal is sensed.

6. The pointing device as claimed in claim 5, wherein the first IR signal is output from the display in sequence along the first axis, and the second IR signal is output from the display in sequence along the second axis.

7. The pointing device as claimed in claim 1, wherein the compensator is configured to calculate the compensated current position by adding the previous position of the pointing device and the current position according to a different ratio based on the deviation of position when the deviation of position is less than the threshold.

8. The pointing device as claimed in claim 7, wherein, when the deviation of position is less than the threshold deviation of position, the compensator is configured to set the weight of the current position to be higher than the weight of the previous position and calculates the compensated current position.

9. The pointing device as claimed in claim 1, further comprising:
    a second sensor configured to sense a motion of the pointing device; and
    a second calculator configured to calculate the motion of the pointing device based on a result of sensing by the second sensor,
    wherein the compensator is configured to calculate a deviation of motion of the pointing device based on the motion of the pointing device calculated by the second calculator, and is configured to calculate the compensated current position by adding the previous position of the pointing device compensated by the compensator, the deviation of position and the deviation of motion according to a different ratio,
    wherein the different ratio is determined based on the deviation of position.

10. The pointing device as claimed in claim 9, wherein, when the deviation of motion is greater than or equal to a threshold deviation of position, the compensator is configured to set a weight of the deviation of motion to be higher than a weight of the deviation of position, and
    when the deviation of motion is less than the threshold deviation of position, the compensator is configured to set the weight of the deviation of position to be higher than the deviation of motion.

11. The pointing device as claimed in claim 1, further comprising:
    a second sensor configured to sense a motion of the pointing device; and
    a second calculator configured to calculate the motion of the pointing device based on a result of sensing by the second sensor,
    wherein the compensator is configured to calculate a deviation of motion of the pointing device based on the motion of the pointing device calculated by the second calculator, is configured to select at least one of the previous position of the pointing device which is compensated by the compensator and the deviation of position, and configured to calculate the compensated current position using the selected one.

12. The pointing device as claimed in claim 11, wherein, when the deviation of position is greater than or equal to a threshold deviation of position and the deviation of motion is less than a threshold deviation of motion, the compensator is configured to calculate the compensated current position using the previous position, and
    when the deviation of position is less than or equal to the threshold deviation of position and the deviation of motion is greater than or equal to the threshold deviation of motion, the compensator is configured to calculate the compensated current position using the previous position and the deviation of position.

13. The pointing device as claimed in claim 1, wherein the threshold deviation of position comprises a second threshold deviation, wherein the second threshold deviation is greater than a first deviation of position,
    wherein when the deviation of position is less than the first threshold, the compensated current position is the current position, and
    wherein when the deviation of the position is between the first and second threshold deviation of position, the compensated current position is calculated by adding the current position and the previous position according to a different ratio.

14. A method for compensating a position of a pointing device, the method comprising:
    a first calculating operation of calculating a current position of the pointing device based on a point of time at which an incident signal is sensed;
    compensating the current position based on a deviation of position which is corresponding to a distance between the current position and a previous position and is calculated using the current position and the previous position of the pointing device calculated in the first calculating operation;
    calculating the compensated current position by differently applying a weight of the current position to the current position and a weight of the previous position to the previous position according to the deviation of position; and
    setting the weight of the previous position to be higher than the weight of the current position regardless of the direction of the deviation and calculating the compensated current position when the deviation of position is greater than or equal to a threshold deviation of position according to a ratio that corresponds to respective weights.

15. The method as claimed in claim 14, wherein the first calculating operation comprises sensing an incident signal which is output from a surface of a display.

16. The method as claimed in claim 15, wherein the first calculating operation comprises sensing a first signal which is generated and output when the display is driven, and sensing a second signal which is generated and output when the display is driven.

17. The method as claimed in claim 16, wherein the first signal comprises a signal which is output due to electro magnetic interference generated in the display, and the second signal comprises an IR signal which is generated and output from the display.

18. The method as claimed in claim 16, wherein the second signal comprises a first IR signal and a second IR signal,
    wherein the first calculating operation comprises calculating the current position on a first axis of the pointing device using a point of time at which the first IR signal is sensed, and calculating the current position on a second axis of the pointing device using a point of time at which the second IR signal is sensed.

19. The method as claimed in claim 14, wherein the compensating operation comprises calculating the compensated current position by adding the previous position of the pointing device and the current position according to a different ratio based on the deviation of position when the deviation of position is less than the threshold.

20. The method as claimed in claim 14, further comprising a second calculating operation of sensing a motion of the pointing device and calculating the motion of the pointing device,
   wherein the compensating operation comprises calculating a deviation of motion of the pointing device based on the motion of the pointing device calculated in the second calculating operation, and calculating the compensated current position by adding a compensated previous position of the pointing device, the deviation of position and the deviation of motion according to a different ratio,
   wherein the different ratio is determined based on the deviation of position.

21. The method as claimed in claim 14, further comprising a second calculating operation of sensing a motion of the pointing device and calculating the motion of the pointing device,
   wherein the compensating operation comprises calculating a deviation of motion of the pointing device based on the motion of the pointing device calculated in the second calculating operation, selects at least one of a compensated previous position of the pointing device and the deviation of position by referring to the deviation of position and the deviation of motion, and calculates the compensated current position using the selected one.

22. The method as claimed in claim 14, wherein the threshold deviation of position comprises a second threshold deviation, wherein the second threshold deviation is greater than a first deviation of position,
   wherein when the deviation of position is less than the first threshold, the compensated current position is the current position, and
   wherein when the deviation of the position is between the first and second threshold deviation of position, the compensated current position is calculated by adding the current position and the previous position according to a different ratio.

23. A pointing device comprising:
   a sensor configured to sense a signal from a display;
   a calculator configured to calculate a sensed current position of the pointing device based upon at least a part of the signal sensed by the sensor;
   a compensator configured to calculate a compensated current position of the pointing device based upon a distance between the sensed current position of the pointing device and a previous position of the pointing device calculated by the calculator,
   wherein the calculating the compensated current position comprises differently applying a weight of the current position to the current position and a weight of the previous position to the previous position according to the deviation of position, and
   wherein the compensator is configured to set the weight of the previous position to be higher than the weight of the current position regardless of the direction of the deviation and configured to calculate the compensated current position when the deviation of position is greater than or equal to a threshold deviation of position according to a ratio that corresponds to respective weights.

24. The pointing device of claim 23, wherein the movement between the sensed current position of the pointing device and the previous position of the pointing device includes a distance on the display between the sensed current position and the previous position.

25. The method as claimed in claim 23, wherein the threshold deviation of position comprises a second threshold deviation, wherein the second threshold deviation is greater than a first deviation of position,
   wherein when the deviation of position is less than the first threshold, the compensated current position is the sensed current position, and
   wherein when the deviation of the position is between the first and second threshold deviation of position, the compensated current position is calculated by adding the sensed current position and the previous position according to a different ratio.

* * * * *